UNITED STATES PATENT OFFICE.

DARLEY C. JOHNSON AND JOHN P. RYAN, OF BROOKLYN, NEW YORK.

PROCESS OF REFINING GOLD AND SILVER.

SPECIFICATION forming part of Letters Patent No. 370,338, dated September 20, 1887.

Application filed June 6, 1885. Serial No. 167,891. (No specimens.)

*To all whom it may concern:*

Be it known that we, DARLEY C. JOHNSON and JOHN P. RYAN, both of Brooklyn, in the county of Kings and State of New York, have invented certain new and useful Improvements in the Art of Refining Gold and Silver, of which the following is a full, clear, and exact description.

Prior to our invention the common practice of refining consisted in placing the various alloys of gold and silver with the baser metals in large cupels, in which the mass was melted and while in the molten state subjected to a blast of air, which was driven over the surface of the metal in order to oxidize the base metals and at the same time carry off the oxides so formed. This method of oxidation was, however, very objectionable, in that varying percentages of the precious metals were carried off mechanically with the oxides. When the operation of cupellation was over, the residuum was run into bars to be again melted, granulated, and parted by acid. After being parted and precipitated the metals were pressed into cakes and baked, in order to expel all moisture, after which they were again melted (this time in crucibles) for the final operation, which consisted in covering the molten metal with bone-ash, leaving only a small opening in the center of such covering. The bone-ash absorbed the base metals that remained after the first oxidizing process; but as its action was somewhat slow, niter, borax, soda-ash, and other suitable fluxes and oxidizing agents were introduced through the opening in the covering of bone-ash. This last operation continued for several hours, the bone-ash being frequently skimmed off as it became saturated with the oxides and fluxes, fresh bone-ash being added after each skimming, until finally the precious metals were reduced to the desired state of purity. This process, as heretofore practiced and as above described, was open to many and serious objections, as will be hereinafter pointed out.

Our improved process obviates the objections referred to and materially decreases the cost as well as the waste of refining.

We take the alloys of the precious metals and cupel them in cupels made of asbestus, preferably of the size adapted to hold from four to six hundred ounces, although any convenient size would answer our purpose. After this simple cupellation is completed the metals are ready for the usual operation of granulating and parting by acid, as they will then be quite as fine as if they had passed through the first step of the old process and been subjected therein to the air-blast. The metals having been granulated and parted by acid are subjected to the usual process of melting and fluxing and oxidizing; but instead of using bone-ash to absorb the oxides and fluxes we use pulverized asbestus, which is placed upon the molten metal in the same way as bone-ash and so as to permit the fluxes to be added as required. This pulverized asbestus is skimmed off from time to time and more added as the process advances, the operation being continued until the base metals are absorbed and removed.

Under the old process the oxidized metals from the first operation, where an air-blast was used, contained a varying percentage, but always a considerable amount of precious metal, which could be extracted only by means of a lengthened and expensive operation or process.

The skimmings of the final operation in the old process consisted of bone-ash saturated with the metallic oxides, the fluxes, and the oxidizing agents used in the operation, and always contained a large amount of precious metal. The process of reducing these skimmings was to put them down in a crucible by the aid of soda-ash, borax, and other substances that would best act on the bone-ash and subject the crucible and its contents to an intense heat for several hours. When this operation was over, the larger part of the metals contained in the skimmings would have settled to the bottom of the crucible, and could be removed to be again passed through the operation of refining; but as all of the precious metals would not "go down," and as some portion of these metals would remain entangled in the unreduced bone-ash and the fluxes, it was necessary to grind up the entire mass above the settled metal and subject it to a long and costly operation in order to extract the remaining metals. By cupelling in asbestus cupels, however, the base metals are absorbed by the cupel, instead of being blown off in the form of oxides, and we thereby get a more complete separation of the metals, as it is well known to every assayer that gold and silver are not absorbed by the cupel.

By this process the costly operation of separating the precious metals from the oxidized base metals blown off in the old way of refining is entirely dispensed with, and by using asbestus instead of bone-ash in the final operation for the purpose of absorbing the oxidized base metals and fluxes the skimmings can be reduced by the aid of less flux and in less time than under the old process, while the reduction is so perfect that not a trace of the precious metals will remain in the fluxes, thereby saving a long and expensive operation necessary under the old system. Not only do we obtain better results by our improved process, but we reduce the actual expense for materials used.

We are aware that asbestus has heretofore been used as a refractory agent in the manufacture of hearths and as an ingredient in certain fluxes.

Having thus fully described our invention, what we claim as new, and desire to secure by Letters Patent, is—

1. In the art of refining precious metals, the herein-described process of absorbing the oxides of the base metals, which consists in placing the alloy of base and precious metals in a cupel, melting the alloy, and covering the surface with pulverized asbestus, substantially as described.

2. In the art of refining gold and silver, the herein-described process of cupelling, which consists in melting the metal in cupels made of asbestus, substantially as described.

3. In the art of refining gold and silver, the process of absorbing and removing the base metals, which consists in placing the partly-purified alloy in a crucible, melting the said alloy, covering it with pulverized asbestus, adding a flux and oxidizing agent, and skimming off and replacing with fresh asbestus from time to time until the metal is reduced to the desired fineness, substantially as described.

4. The process of refining gold and silver, which consists, first, in cupelling the alloy; second, in granulating and parting the metal by acid; third, in placing the partly-purified alloy in crucibles and melting the said alloy; fourth, in covering the molten metal with pulverized asbestus, adding a flux and oxidizing agent, and skimming and replacing the asbestus from time to time until the metal is reduced to the desired fineness, substantially as described.

DARLEY C. JOHNSON.
JOHN P. RYAN.

Witnesses:
H. A. WEST,
C. SEDGWICK.